United States Patent [19]

Hoogland

[11] Patent Number: 4,998,425
[45] Date of Patent: Mar. 12, 1991

[54] TOOL BOX SECURING ARRANGEMENT

[76] Inventor: William Hoogland, 8220 Eucalyptic Dr., Bakersfield, Calif. 93306

[21] Appl. No.: 524,153

[22] Filed: May 16, 1990

[51] Int. Cl.⁵ ............................................. B65D 55/14
[52] U.S. Cl. ........................................ 70/159; 70/164; 70/358; 70/DIG. 65; 70/DIG. 34; 224/42.42; 224/315; 296/37.6
[58] Field of Search ................. 70/158, 159, 163, 164, 70/166, 63, 258, D34, D56, D64, D65, D19; 224/42.42, 315; 292/259, D18, D21, D63; 312/D33; 296/37.5, 37.6

[56] References Cited

U.S. PATENT DOCUMENTS

| | | | |
|---|---|---|---|
| 212,242 | 2/1879 | Loper, Jr. | 292/259 |
| 1,421,726 | 7/1922 | Saunders | 70/164 |
| 4,488,669 | 12/1984 | Waters | 224/42.42 |
| 4,562,708 | 1/1986 | Gros | 70/159 |
| 4,674,665 | 6/1987 | Van Kirk | 224/42.42 |

*Primary Examiner*—Michael F. Trettel
*Assistant Examiner*—Darnell Boucher
*Attorney, Agent, or Firm*—Beehler & Pavitt

[57] ABSTRACT

An arrangement to releasably secure each of the two doors of a utility carrier box mounted transversely behind the cab of a pick-up vehicle and on the side walls of the pick-up, the arrangement comprising staples secured to the end walls of the box below the end flanges of the doors when the doors are in closed position, and a steep strap extending from below one staple, over the top of the closed box and down to a point beyond the other staple, and in conformity with the surface of the closed box over which the strap means extends, each end of the strap being slotted to enable the link of the staple beyond which it extends to be passed through the slot and to receive the link of a padlock which is locked.

2 Claims, 2 Drawing Sheets

TOOL BOX SECURING ARRANGEMENT

FIELD OF THE INVENTION

This invention relates to the field of arrangements for securing the doors on containers generally and, in particular, for securing box-type containers which are mounted across the back of pick-up trucks.

DESCRIPTION OF THE PRIOR ART

In a number of fields, such as construction, where it is necessary for a worker driving to a job site to carry with him a large number of different tools and/or certain types of parts for which he may find frequent need in performing his work, such tools and/or parts are ordinarily kept in some type of box or chest. Examples of such utility boxes are those shown in U.S. Pat. Nos. 4,848,626 issued to John E. Waters, 4,674,665 issued to Le Roy Van Kirk and 4,728,017 issued to Randall J. Mullican. However, because of the possibility that such a box or chest, if not anchored down, could easily be picked up and removed from any vehicle and, particularly from an open flat bed pick-up, when the owner of vehicle has left the same for any number of purposes, a number of manufacturers have provided box-type carriers which are permanently mounted behind the cab of a pick-up or similar vehicle, as shown in the above mentioned patents. Among the carriers thus provided is a popular one sold under the trademark "DELTA" which is similar to what is shown in the Van Kirk patent. This carrier is mounted behind the cab transversely of the vehicle axis and includes an upper portion which seats on the upper edges of the side walls of the pick-up, and a lower portion which extends down adjacent the pick-up walls, but between them. This type carrier may be bolted to the side walls of the pick-up or to its rear wall, or even to the back of the cab. The top side of the carrier is covered by a central rectangular section which is permanently closed and to each side of which there is hinged a door or closure which extends to and over the end wall of the carrier.

Heretofore, the manufacturers of such carriers have provided a key lock system whereby, when the door is closed over the end wall, it may engage the stop arm of a cylindrical lock when the lock is turned into locking position by a key. This may prevent a thief from lifting up the door with his bare hands, but it has been found to be quite ineffectual in securing the door where the thief may use a small crow bar, or large screw driver or other prying tool which is inserted between the end wall of the carrier and the end of the hinged door or other type of pivoted closure. As a result, such carriers will frequently show evidence of previous prying entry by which the pickup owner may have lost to the thief all of the tools and other items which were contained in his carrier. Also, the lock frequently displays a key number, with the result that a thief may sometimes obtain the proper key to open the lock.

In an effort to prevent this type of unauthorized entry, it has been common practice for pickup truck owners to attach a staple to either the end wall or the end edge of the hinged door, and a hinge on the other of these two parts which come together, with the hinge having a plate portion which slips over the staple, and these two elements are secured by some type of padlock. While this arrangement may thwart theft by prying the end of the box open, it is not theft proof for the reason that the hinge may be easily unscrewed so that the door may then be pryed open and the tools stolen.

Thefts of a worker's tools from these carriers inevitable constitutes a serious economic blow to the worker since, not infrequently, the total cost of a worker's tools can amount to as much as a $1,000.00 or more.

Apart from the construction field, these carriers may also be used to contain other special equipment which may be carry expensive hunting and fishing equipment. Thefts of shotguns and rifles from these carriers could result in losses of several thousands of dollars.

There thus exists a great need for an arrangement which may better secure such box carriers mounted on pickup trucks.

SUMMARY OF THE INVENTION

The present invention provides a much more effective arrangement for securing box type tool and other equipment carriers of the type heretofore described.

On each end wall, a staple is mounted by smooth head bolts which are secured inside the end wall by lock washers and nuts threaded on to the bolts. The staple may extend in a vertical plane normal to the end wall of the box carrier. A strap of flat steel, preferably 2½ inches in width and ⅛ inch thick is provided to extend from below the staple on one end wall across the top of the carrier and around to a point below the staple on the other end wall. Desirably, this strap is pressed into a contour conforming with the end wall and the end of the hinged closure when the door or closure is in its closed position. Each extremity of the steel strap is slotted so that it may be slipped over the protruding staple, whereupon the open link of a heavy padlock is slipped through the staple and closed into the lock. When locked thusly at both ends, the carrier may not be opened with practically smashing both ends of the carrier. The noise generated by such an activity would be most likely to attract unwanted attention to the potential thief. The hinged doors of the carrier cannot be pried open quietly with a mere crow bar or other prying tool.

Whenever it is desired by the truck owner to open either one of the top doors on his carrier, it is a simple matter to unlock the padlock, remove it from the staple, and pull the end of the strap off the staple. Thereby, that door may be lifted up for access to the interior of that portion of the box covered by that door. It is unnecessary to do anything with the other end of the strap since the latter simply rides up over the unlocked door, but remains in place over the other locked door.

The present invention will be found to be most effective in preventing tool thefts from pick-up box carriers.

DESCRIPTION OF THE PREFERRED EMBODIMENT

Figure 1:
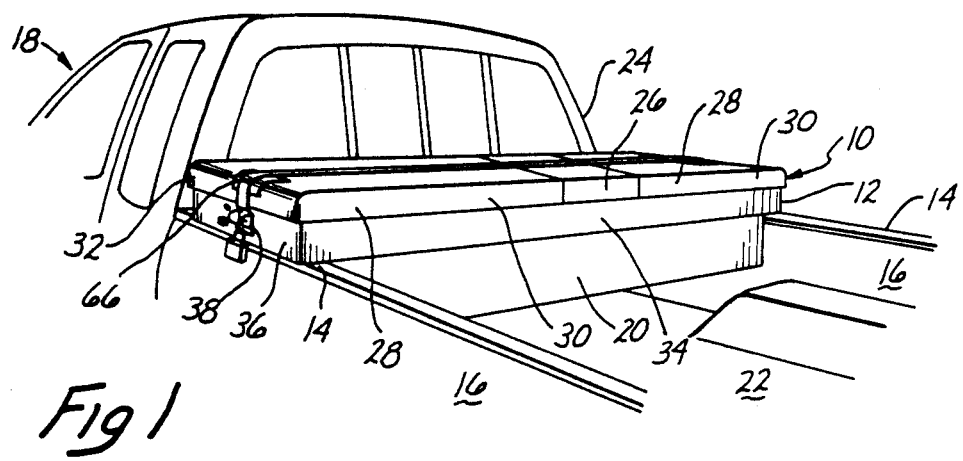
FIG. 1 is a perspective view of a portion of the rear of a pick-up truck showing a tool carrier mounted behind the cab and with the door secured by the arrangement of the present invention.

Referring to FIG. 1, 10 is a box-like tool carrier having an upper portion 12 which is seated on the upper edges 14 of the side walls 16 of a pick-up truck, and a lower portion 20 which extends down toward the bed 22 of the pick-up. The carrier 10 is mounted behind and close to the rear of the cab 24 of the truck 18.

The conventional carrier includes a permanently secured central cover section 26 on each side of which is hingedly mounted a door or closure 28. Each of these closures 28 comprises a pair of side walls 30 and an end wall 32 which, when the door 28 is closed, overlap the side walls 34 and end walls 36 of the upper portion 12 of the carrier 10.

The arrangement of the present invention involves first mounting on each end wall 36 of the upper portion 12 of the carrier, a staple element 38 by means of smooth head bolts 40 which are passed through orifices 42 in the staple base plate 44 and secured inside the end wall 36 by lock washers 44 and nuts 46.

Figure 4:
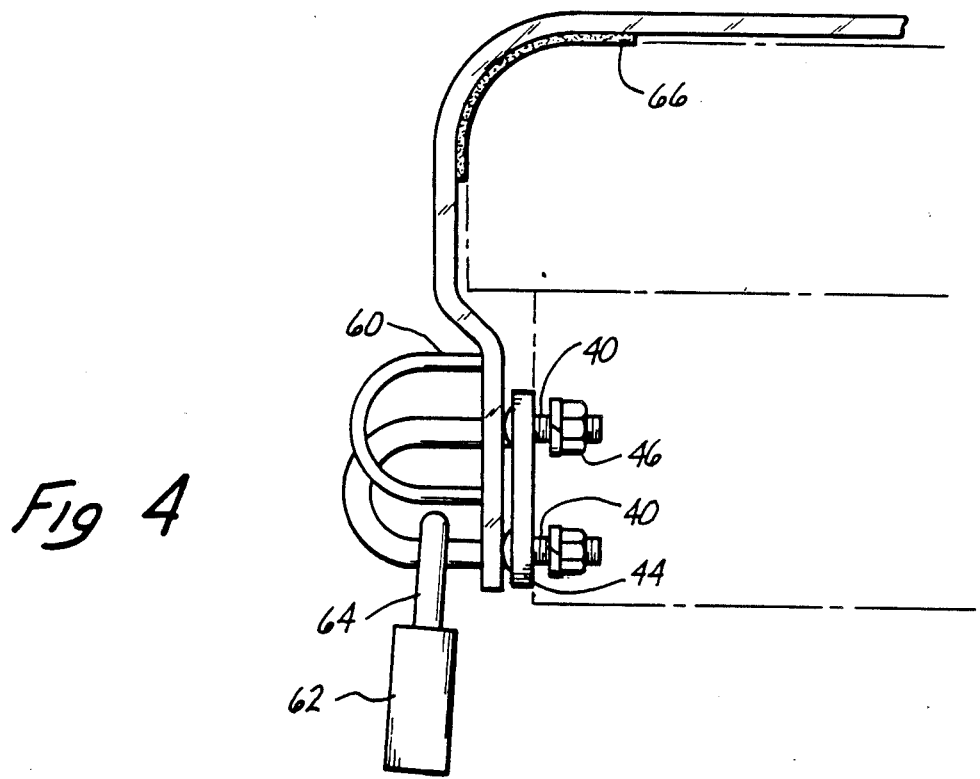
FIG. 4 is an enlarged side view of the locked end wall shown in FIG. 1.
Figure 2:
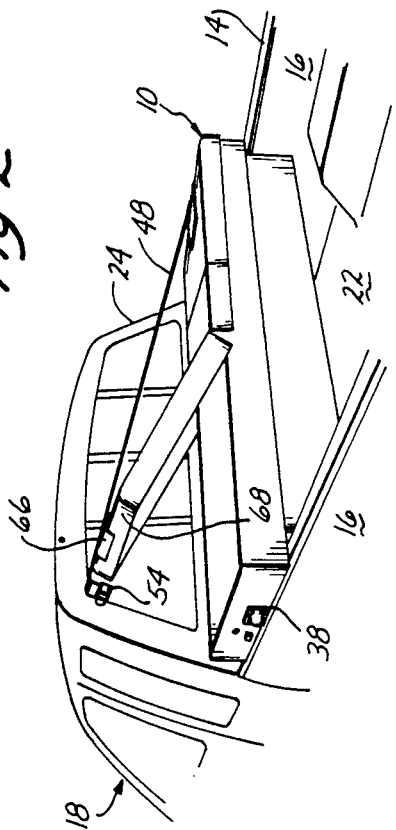
FIG. 2 is a perspective view similar to FIG. 1, but showing a door in open position after the end of the strap has been removed from one end wall staple.
Figure 3:
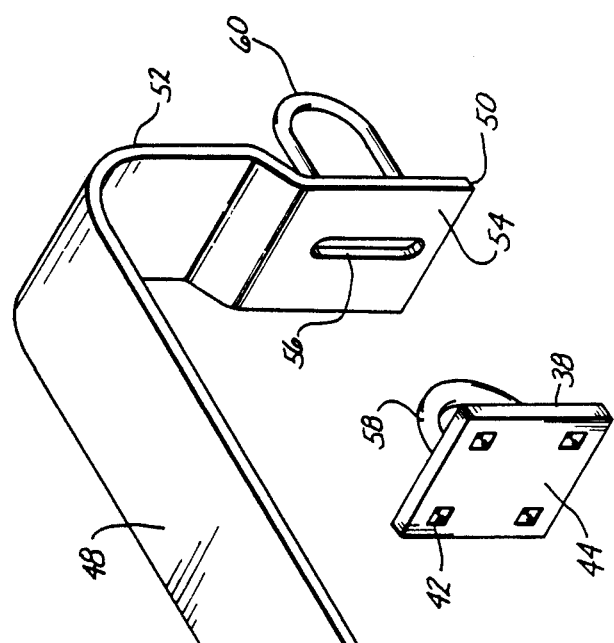
FIG. 3 is an enlarged perspective view partially broken away and exploded showing the elements of the arrangement of the present invention.
Figure 3:
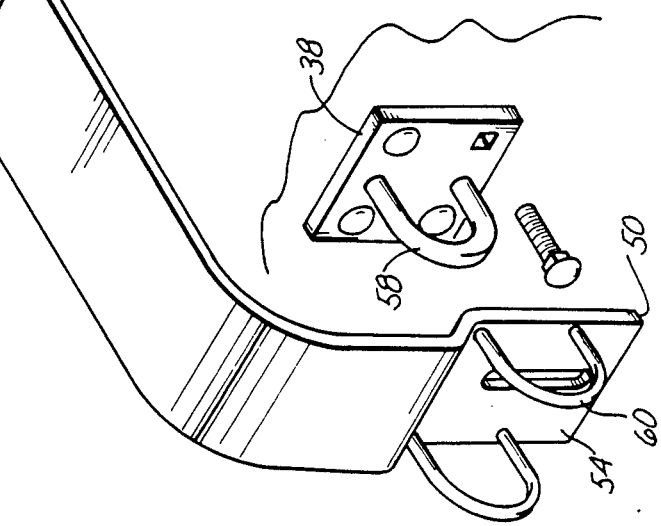

As best shown in FIG. 3, a steel strap-like member 48 is formed of a length of flat steel sufficient to enable it to extend from below the staple element 38 on one end wall 36 over the top of the carrier to a point below the staple element 38 on the other end wall 36 of the carrier. This steel strap member 48 desirably is pressed near its extremities 50 to conform at 52 with the shape of the end wall 32 of the closure 28 when disposed in its closed position over the end wall 36 of the upper portion 12 of the carrier. This conformity is best shown in FIGS. 3 and 4 of the drawings and includes a flat end portion 54 which is centrally slotted at 56 to enable the link 58 of the staple element 38 to be passed through it. It is also desirable to from the flat portion 54 of each strap extremity 50. Lastly, a padlock 62 having a strong link 64 completes the arrangement. However, for a reason which will be hereafter explained in connection with the operation of the arrangement, it is also desirable to provide a friction pad 66 to extend over the upper edge 68 of the end wall 32 of each door 28.

In use, it will be appreciated that, after a staple plate 44 has been mounted on each end wall 36 of the upper portion 12 of the carrier, one end 50 of the strap element 48 is aligned centrally along the long axis of the carrier 10 and the link 58 of the staple 38 is passed through the slot 56 and secured against withdrawal from the slot 56 by passing the padlock link 64 through the staple and securing it in the lock 62. The other end of the strap-like element 48 is similarly brought over the opposite end of the carrier and the staple link 58 on that end is passed through the slot 56 and locked in a similar fashion. It will be found that with the strap 48 thus secured at both ends, neither door 28 can be raised.

However, should the truck owner desire to obtain access to one end of his carrier 10, it is only necessary for him to remove the link 64 of his padlock 62 on that end, and, by pulling outwardly on the gripping means 60, disengaging the staple link 58 from the slot 56, he may then raise the door 28 with the conformed portion 52 of the strap element 48 simply sliding over the friction mat 66. Reclosing is a simple matter with the staple link 58 again being passed through the slot 56 to enable the padlock 62 to be replaced.

The present invention will provide much greater security for tool carriers than has been heretofore possible.

I claim:

1. Means for securing a tool carrier disposed transversely behind the cab of a pick-up truck and above its carrier bed, said tool carrier comprising an extended rectangular box having a bottom, a pair of end walls and a pair of side walls and a center top section permanently secured transversely of the box to the upper areas of both side walls, and a pair of closure doors, each having one end hinged on the top section to pivot between a first position where the door's end opposite the hinged end rests on the top of an end wall for securing thereto, and a second position pivoted upwardly from the end wall to permit access to the inside of at least a portion of the tool carrier box, said securing means comprising:

a staple, said staple comprising a flat base plate bolted centrally to the outside of the upper edge of each end wall by fasteners removable only from the inside of the end walls, and a link extending normally upwardly from said base plate;

steel strap means, said strap means extending from below the staple link on one end wall to below the link on the other end wall and contoured to abut the said top section and both closure doors when they are in their first position, each end of said steel strap means being slotted to fit over the staple link on one of the two end walls and to leave an opening in the staple link through which the link of a padlock may be passed; and a plurality of removable padlock means each having a link for insertion through each staple link, after the end of the steel strap means has been brought over an end wall and the staple link has been passed through the slot, said padlock thereupon being locked against opening by other than its specific unlocking means.

2. The securing means as described in claim 1 wherein gripping means are provided near each extremity of the steel strap means, thereby to enable said extremity to be manually pulled free of the staple link passed through the slot and lifted upwardly so that each closure door may be opened for access to the inside of the carrier.

* * * * *